United States Patent [19]

Rissmann

[11] Patent Number: 4,572,041
[45] Date of Patent: Feb. 25, 1986

[54] TORQUE LIMITING WRENCH

[76] Inventor: Horst-Günter Rissmann, Trebbiner Strasse 12, 1000 Berlin 61 (West), Fed. Rep. of Germany

[21] Appl. No.: 732,581

[22] Filed: May 10, 1985

[30] Foreign Application Priority Data

Oct. 5, 1984 [DE] Fed. Rep. of Germany ....... 3437083

[51] Int. Cl.[4] .................................... B25B 25/159
[52] U.S. Cl. .................................. 81/477; 464/37
[58] Field of Search ............. 81/477, 473, 474, 475; 464/37

[56] References Cited

U.S. PATENT DOCUMENTS

| | | | |
|---|---|---|---|
| 2,472,659 | 6/1949 | Greer | 81/477 |
| 2,558,158 | 6/1951 | Rock | 81/477 |
| 2,706,388 | 4/1955 | Potgieter | 464/37 |
| 3,830,119 | 8/1974 | Travis | 81/477 |

Primary Examiner—James L. Jones, Jr.
Attorney, Agent, or Firm—Collard, Roe & Galgano

[57] ABSTRACT

A torque limiting wrench is provided having an input member and an output member coupled to each other so as to limit the transmitted torque therebetween. The coupling is provided by spring rods supported in the output member surrounding the input member, the spring rods being arranged along a pitch circle disposed concentric with respect to the input member and, in the tension-free state, disposed within the zone of axial catches arranged on the circumference of a collar provided on the input member. When a sufficient input torque is admitted, the spring rods are bent outwardly by the flanks of the catches and out of the range of the catches when the predetermined torque is reached.

7 Claims, 3 Drawing Figures

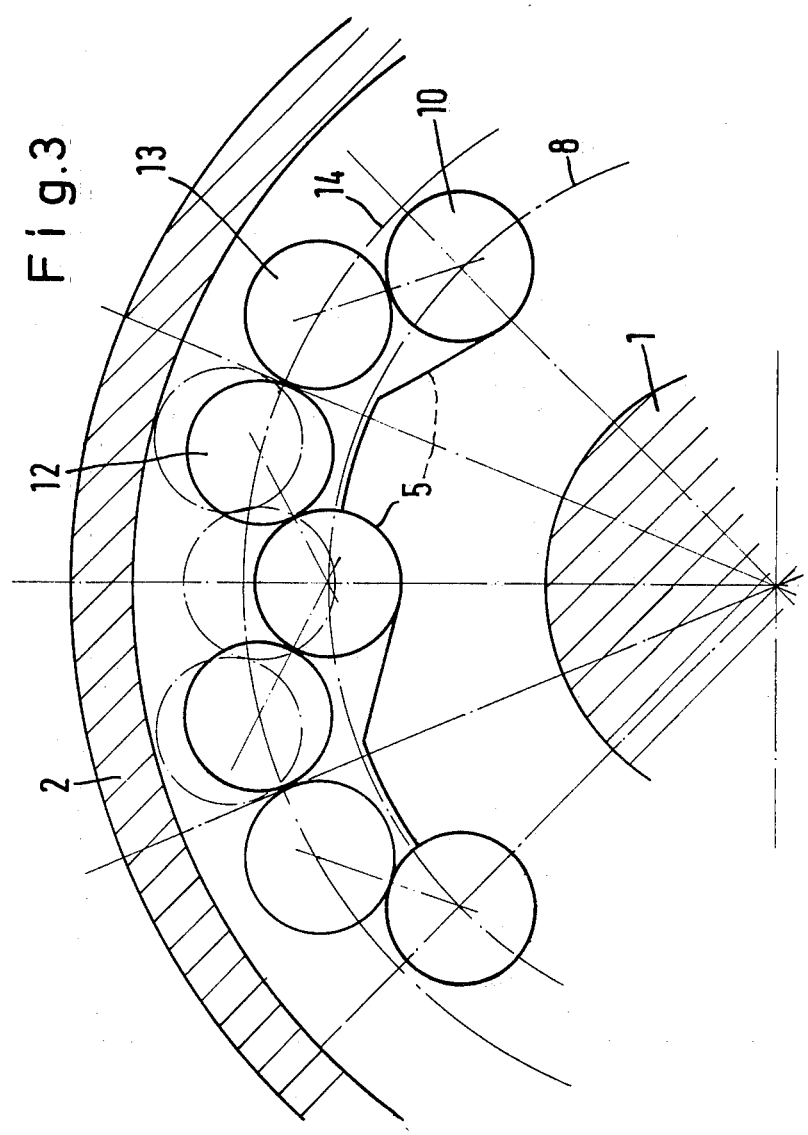

TORQUE LIMITING WRENCH

The present invention relates generally to a torque limiting wrench and, more particularly, it relates to such a wrench wherein the torque transmitted is limited to a predetermined value.

Known torque limiting wrenches having an input member and an output member coupled with each other by a device for limiting the transmitted torque are relatively costly to manufacture. Also, when coil springs are used in such wrenches, adjustment of the predetermined torque is more difficult because of the known properties of such springs.

The object of the present invention is to provide a torque limiting wrench of the type described above wherein adjustment of the predetermined torque is facilitated while, at the same time, a compact design and low manufacturing cost are achieved.

The above object, as well as others which will hereinafter become apparent, is accomplished according to the present invention by providing a torque limiting wrench having an input member and an output member coupled with each other so as to limit the transmitted torque therebetween. The input member is aligned with the output member and is rotatably supported therewith. The coupling is formed by a collar provided on the input member having a plurality of axially directed, circumferentially disposed catches, a plurality of spring rods, each being associated with a catch, arranged on a pitch circle disposed coaxially with respect to the input member with at least one of the ends of said rods being radially supported by the output member, the pitch circle being such that the spring rods, in the tension-free state, are engaged within an associated catch. The catches are profiled in a way such that when a sufficient torque is applied to the input member, the input member rotates with respect to the output member and the spring rods bend outwardly in the radial direction, the spring rods disengaging from the catches when a predetermined torque is reached.

A particular advantage results from the utilization of spring rods. The initial material used has very constant flexing parameters that can be readily determined and which facilitate the selection of the required support length allowing the required bending of the spring rods with a predetermined diameter of said rods.

With freely supported spring rods which are clamped on one side, it is possible to achieve a short axial length of the torque limiting wrench unless an excessive size of the tool is required for the force to be applied. In addition, adjustment of the torque limit is facilitated if the supported length of the spring rods is adjusted after the rods have been installed in the tool. The maximum individual load of the spring rods is reduced where the rods are arranged on a plurality of pitch circles. This also permits a reduction in the supported length of the spring rods and thus the total length of the torque limiting wrench.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 3 is a schematic partial cross-sectional enlarged view of another embodiment of the torque limiting wrench of the present invention.

Figure 1:
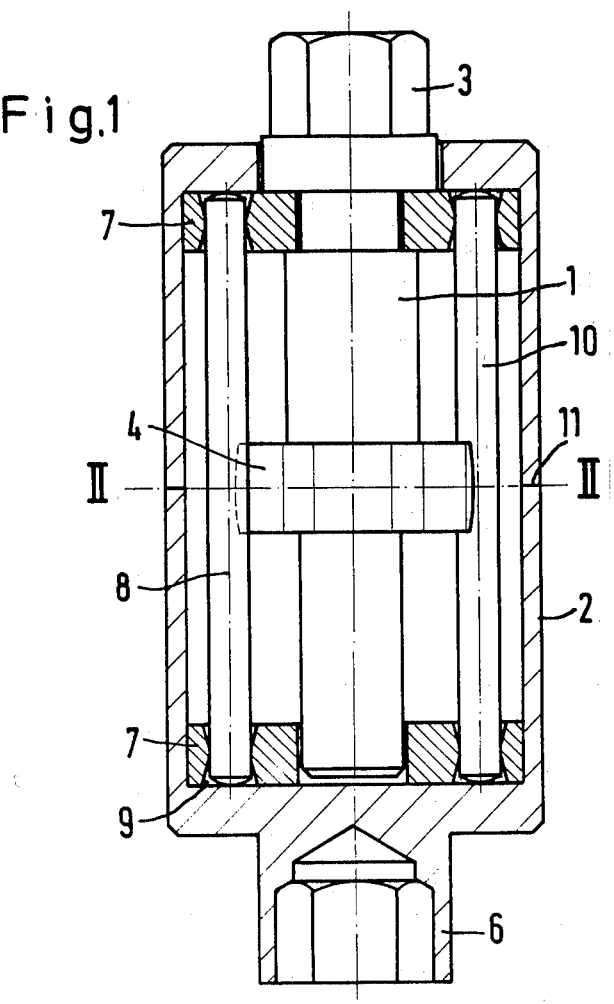
FIG. 1 is a partial axial cross-sectional view of a torque limiting wrench according to the present invention.
Figure 2:
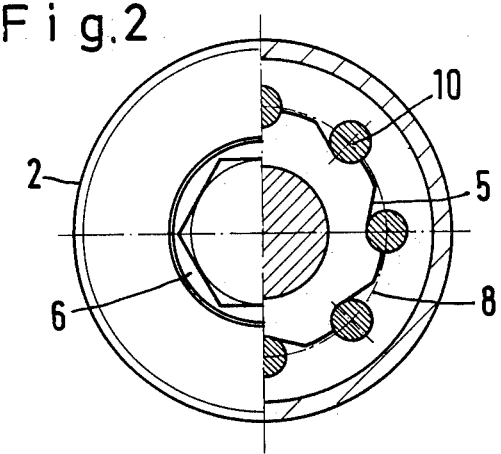
FIG. 2 is a plan view of the output side of the torque limiting wrench showing a part thereof in section along the line II—II of FIG. 1.

Now turning to the drawings, there is shown a torque limiting wrench in FIGS. 1 and 2 having a cylindrically shaped input member 1 surrounded by a tubularly shaped output member 2. On the exterior of output member 2, input member 1 has a hexagon head 3 for the attachment of a wrench. At its other end, input member 1 is rotatably supported in output member 2.

A collar 4 having notch-like catches 5 uniformly distributed along its circumference is disposed centrally along the axial length of input member 1.

Output member 2 is provided with a head 6 comprised of a hollow hexagon member for receiving the hexagon head of a component to be tightened. Bearings 7 are rigidly connected at both ends of output member 2 and are provided with bores 9 disposed on a pitch circle 8. Bores 9 receive spring rods 10 which are radially supported in the bores of the bearings in line contact therewith. Pitch circle 8 is selected in such a way that in the tension-free state, each spring rod 10 is disposed between the flanks of a catch 5. In order to achieve low frictional forces between input member 1 and spring rods 10, collar 4 and catches 5 are shaped in the axial direction so as to conform to the curve of flexure of spring rods 10. Supports 7 are disposed with respect to collar 4 such that collar 4 is disposed centrally along the axis of spring rods 10.

In order to facilitate the installation of input member 1 in output member 2, the input member is comprised of two parts, which are connected with each other along their interface 11. By selecting the surface lengths of the parts, the supported lengths of spring rods 10 can be adjusted in a simple manner.

When input member 1 rotates relative to output member 2, as a result of a sufficient torque applied to input member 1, one of the flanks of each catch 5 will bend its associated spring rod 10 outwardly, and, when the predetermined torque has been reached, the spring rods are bent sufficiently to be outside the range of or disengaged from catches 5 thereby cancelling the coupling between input member 1 and output member 2 that existed up to this point.

The two flanks of each catch 5 may be provided with dissimilar profiles as shown. Preferably, one flank is in the form of an inclined plane thus permitting spring rod 10 to move therealong as it is bent by the force exerted thereon by collar 4. The other flank may have a more abrupt shape so as to prevent spring rod 10 from surmounting it.

Spring rods 10 are cut to size from commercial rod or bar stock. The supported length of the spring rods is determined based on the constant bending parameters of the rod material and the diameter of the rods, so that the required deflection or bending of the spring rods will occur once the predetermined torque is reached. In this way, adjustment of the predetermined torque is easy and, most of all, accurate.

Various modifications of the design are possible within the framework of the invention.

In FIG. 3 there is shown that in addition to the one crown of spring rods along pitch circle 8, another crown of spring rods 12 and 13 along pitch circle 14 is supported in output member 2. These additional spring rods are disposed outside the range of catches 5, but between spring rods 10 and in contact with the latter. When an input torque is applied, all spring rods are deformed, assuming the dash-dot position within the zone of collar 4 once the predetermined torque has been reached. In this way, the maximum individual load of the spring rods is substantially reduced. Also, a shorter supported length of the spring rods can be selected, which, in turn, reduces the overall length of the torque wrench.

With a modified embodiment not shown in the drawings, more than two concentric rings of spring rods may be provided. Also, between the spring rods of a radially inner circle, only one spring rod of the adjacent, radially outer ring may be arranged in contact with the former rods.

In addition, other modifications of the designs shown in the drawings are feasible.

By way of example, spring rods 10 may be secured on one side on output member 2 and freely project into the range or zone of collar 4 of input member 1. In this way, the overall length of the tool is substantially shortened; however, in this case, only a lower force will be available for deflecting spring rods 10 outwardly. This design thus is advantageous with lower predetermined torques.

According to another modification, spring rods 10 are supported at both ends and the footplates or bearings 7 are guided axially adjustable in output member 2, where said bearings may be randomly locked or arrested in order to change the supported length of the freely supported spring rods 10, which permits an additional adjustment of the tool.

While a few embodiments of the present invention have been shown and described, it will be obvious that many changes and modifications may be made thereunto without departing from the spirit and scope of the invention.

What is claimed is:

1. A torque limiting wrench, comprising:
  (a) an output member,
  (b) an input member aligned with said output member and rotatably supported therewith,
  (c) a collar provided on said input member having a plurality of axially directed circumferentially disposed catches, and
  (d) a plurality of spring rods, each being associated with a catch of said collar, arranged on a pitch circle disposed coaxially with respect to said input member, at least one of the ends of said rods being radially supported by said output member, said pitch circle being such that said spring rods, in the tension-free state, are engaged within an associated catch of said collar, said catches being profiled so that when a sufficient torque is applied to said input member, said spring rods bend outwardly in the radial direction and as a result of their design disengage from said catches at a predetermined torque applied to said input member.

2. The torque limiting wrench as defined in claim 1, wherein the circumference of said collar and said catches are shaped in the axial direction to conform to the flexure curve of said spring rods.

3. The torque limiting wrench as defined in claim 1, wherein said spring rods are supported at both ends, and said collar is disposed centrally along the axis of said spring rods.

4. The torque limiting wrench as defined in claim 1, which further comprises additional spring rods arranged and supported in at least one additional pitch circle disposed radially outside of the zone of said catches circumferentially in the space between the spring rods of said first pitch circle, the adjacent spring rods of different pitch circles being in contact with each other.

5. The torque limiting wrench as defined in claim 4, wherein a plurality of spring rods are arranged on said at least one additional pitch circle circumferentially between the spring rods of said first pitch circle, said spring rods of said at least one additional pitch circle being in contact with each other.

6. The torque limiting wrench as defined in claim 1, wherein each catch of said collar has a first flank which cooperates with the associated spring rod in one direction of rotation and a second flank which cooperates with the spring rod in the other direction of rotation, the profiles of said flanks being different.

7. The torque limiting wrench as defined in claim 3, wherein said spring rods are axially freely supported on footplates, said footplates being axially adjustable and lockable with respect to said output member.

* * * * *